UNITED STATES PATENT OFFICE.

WILLIAM LOID GEORGE, OF WILLIAMS, ARIZONA TERRITORY, ASSIGNOR TO GEORGE METAL EXTRACTING COMPANY, OF ARIZONA TERRITORY.

PROCESS OF EXTRACTING METALS FROM THEIR ORES.

No. 854,998.     Specification of Letters Patent.     Patented May 28, 1907.

Application filed January 23, 1902. Serial No. 90,981.

*To all whom it may concern:*

Be it known that I, WILLIAM LOID GEORGE, a citizen of the United States, residing at Williams, Coconino county, Territory of Arizona, have invented new and useful Improvements in Processes of Extracting Metals from Their Ores, of which the following is a specification.

This invention relates to the process of obtaining metals from their ores; and has for its object to treat the ores in such a manner as to reduce the metal values to the metallic state and cause the metals to gather or collect into small grains or globules, whereby they may be separated from the other components by concentration.

My process is primarily intended for ores which are of very low grade, or poor in metal values, which ores cannot ordinarily be profitably transported to a smelting or lixiviating plant, or worked by the most modern methods of treatment. Such, for example, are ores containing, say—2 per cent. copper, 10 per cent. silica, 15 per cent. iron, 65 per cent. carbonate of lime, 4 per cent. sulfur, 4 per cent. talc.

I attain the objects of my invention by first crushing the ore to a proper fineness, then placing the crushed ore in a kiln, furnace, or other suitable receptacle together with the required amount of wood, coal, coke, crude oil or charcoal, and then subject the entire mass to a high heat for a short time, usually one hour is sufficient, whereby the metal values are reduced to the metallic state, and the particles thereof are collected in small grains or globules.

When the ores are at the proper heat they are drawn from the kiln or furnace and allowed to fall directly into cold water, which obviously serves as an air-excluding bath. Should the heat be carried farther or be continued longer the process would become a roasting process, or even one for matting ores.

The heat liberates the sulfur and gaseous components and all volatile components that are usually found united with the ores, as chlorin, carbonic acid, arsenic, etc. The metals, or a part thereof, are collected in small grains or globules, in which form they have a greater specific gravity than do the particles of original ore, so that by crushing the entire mass to a proper degree of fineness the heavier particles of metals can be retained by concentration, and the lighter particles may be placed in tanks or vats, ready for lixiviation.

Having thus described my invention, what I claim as new and desire to secure by Letters Patent is:—

1. The process of preparing ores for further metallurgical treatment, which consists in treating the ore so as to reduce the metal values to the metallic state and cause the particles thereof to gather or collect in small grains or globules.

2. The process of treating ores which consists in crushing the ore, then heating the crushed ore in contact with carbon to a temperature and for a period of time sufficient only to reduce the mineral dispersed through it to the metallic state and cause the particles thereof to gather or collect in small grains or globules.

3. The process herein described of treating ores, which consists in heating the ore to a temperature and for a period of time, sufficient only to substantially change the specific gravities of the metal values relative to the specific gravities of the other components of the ore.

4. The process of preparing an ore for the separation of the metals by concentration, which consists in heating the ore in contact with carbon to a temperature and for a period of time, sufficient only to reduce the metal values to the metallic state and cause the particles thereof to gather or collect in small grains or globules.

In testimony whereof I have signed my name to this specification in the presence of two subscribing witnesses.

WILLIAM LOID GEORGE.

Witnesses:
E. H. SIMPSON,
E. N. CRAWFORD.